United States Patent [19]

De Vaulx

[11] Patent Number: 4,888,575

[45] Date of Patent: Dec. 19, 1989

[54] DEVICE HAVING A MODIFIABLE CODE FOR PROTECTING AGAINST THEFT OF AUTOMOBILE VEHICLES

[75] Inventor: Louis De Vaulx, Versaille, France

[73] Assignees: Automobiles Peugeot, Paris; Automobiles Citroen, Neuilly/Seine, both of France

[21] Appl. No.: 139,800

[22] Filed: Dec. 30, 1987

[30] Foreign Application Priority Data

Dec. 31, 1986 [FR] France .................................. 86 18445

[51] Int. Cl.$^4$ ...................... B60R 25/04; H01H 27/00
[52] U.S. Cl. ............................... 340/426; 340/825.31; 340/543; 307/10.2; 307/10.4; 307/10.5; 361/171; 361/172; 180/287
[58] Field of Search ..................................... 340/63–65, 340/825.3, 825.32, 825.31, 825.34, 825.5, 542, 543; 307/10 AT, 10 R; 361/171, 172; 180/173, 174, 287

[56] References Cited

U.S. PATENT DOCUMENTS

| 4,206,491 | 6/1980 | Ligman et al. | 361/172 |
| 4,437,153 | 3/1984 | Kamiyama et al. | 340/63 |
| 4,652,860 | 3/1987 | Weishaupt et al. | 340/63 |
| 4,754,255 | 6/1988 | Sanders et al. | 340/63 |

FOREIGN PATENT DOCUMENTS 2108189 5/1983 United Kingdom .
WO01477 7/1980 World Int. Prop. O. .

Primary Examiner—Donnie L. Crosland
Attorney, Agent, or Firm—Burns, Doane, Swecker & Mathis

[57] ABSTRACT

The device can be applied to vehicles provided with an electronic control device for the vehicle engine. The protecting device for includes a keyboard for entering a user's code, a microprocessor for converting entered data coming from the keyboard into an output message containing the user's code, programmable and non-volatile memory for storing the code for unlocking the engine electronic control device, a microprocessor for comparing the unlocking code stored in the memory with the user's code contained in said message coming from the keyboard and unlocking the engine electronic control device when there is coincidence of the code contained in the memory with that contained in said output message, and the microprocessor and the memory being capable of effecting replacement of the unlocking code of the engine control device with a new unlocking code through action on the keyboard.

8 Claims, 4 Drawing Sheets

DEVICE HAVING A MODIFIABLE CODE FOR PROTECTING AGAINST THEFT OF AUTOMOBILE VEHICLES

BACKGROUND OF THE INVENTION

The present invention relates to the protection of in particular automobile vehicles and more particularly concerns the protection against theft of vehicles equipped with electronic microprocessor devices controlling a device of the vehicle, such as the engine, the gearbox or some other device.

It has already been proposed to provide a protection of vehicles by means of a remote control device comprising a box emitting a pre-established coded message and, on the vehicle, a coded message receiver, coupled to a decoder which, after checking the conformity of the code emitted by the emitter to that of the proprietor of the vehicle, controls the supply of the means for electrically opening the doors of the vehicle.

Such devices have the drawback of being ineffective when it is possible to gain access to the interior of the vehicle, for example by breaking a glass or taking advantage of a window glass which has been left partly open.

SUMMARY OF THE INVENTION

The invention aims at remedying the disadvantages of the known devices by employing the microprocessor in vehicles provided with a device electronically controlling the operation of for example the engine to protect the vehicle against theft.

The invention therefore provides a device for protecting against theft in particular an automobile vehicle provided with an electronic device controlling a device of the vehicle such as the motor, said protection device comprising a keyboard for entering a user's code, means for converting the entered data coming from the keyboard into an output message containing said user's code, programmable and non-volatile memory means for storing the code for unlocking the control device of the engine, means for comparing the unlocking code, stored in said memory means with the user's code contained in said message coming from the keyboard and for unlocking said electronic control device of the engine upon coincidence of the unlocking code contained in the memory means with the user's code contained in said output message, and means for substituting for the unlocking code of the control device of the engine a new unlocking code by action on said keyboard.

BRIEF DESCRIPTION OF THE DRAWINGS

A better understanding of the invention will be had from the following description which is given solely by way of example with reference to the accompanying drawings in which.

DESCRIPTION OF THE PREFERRED EMBODIMENT

Figure 1:
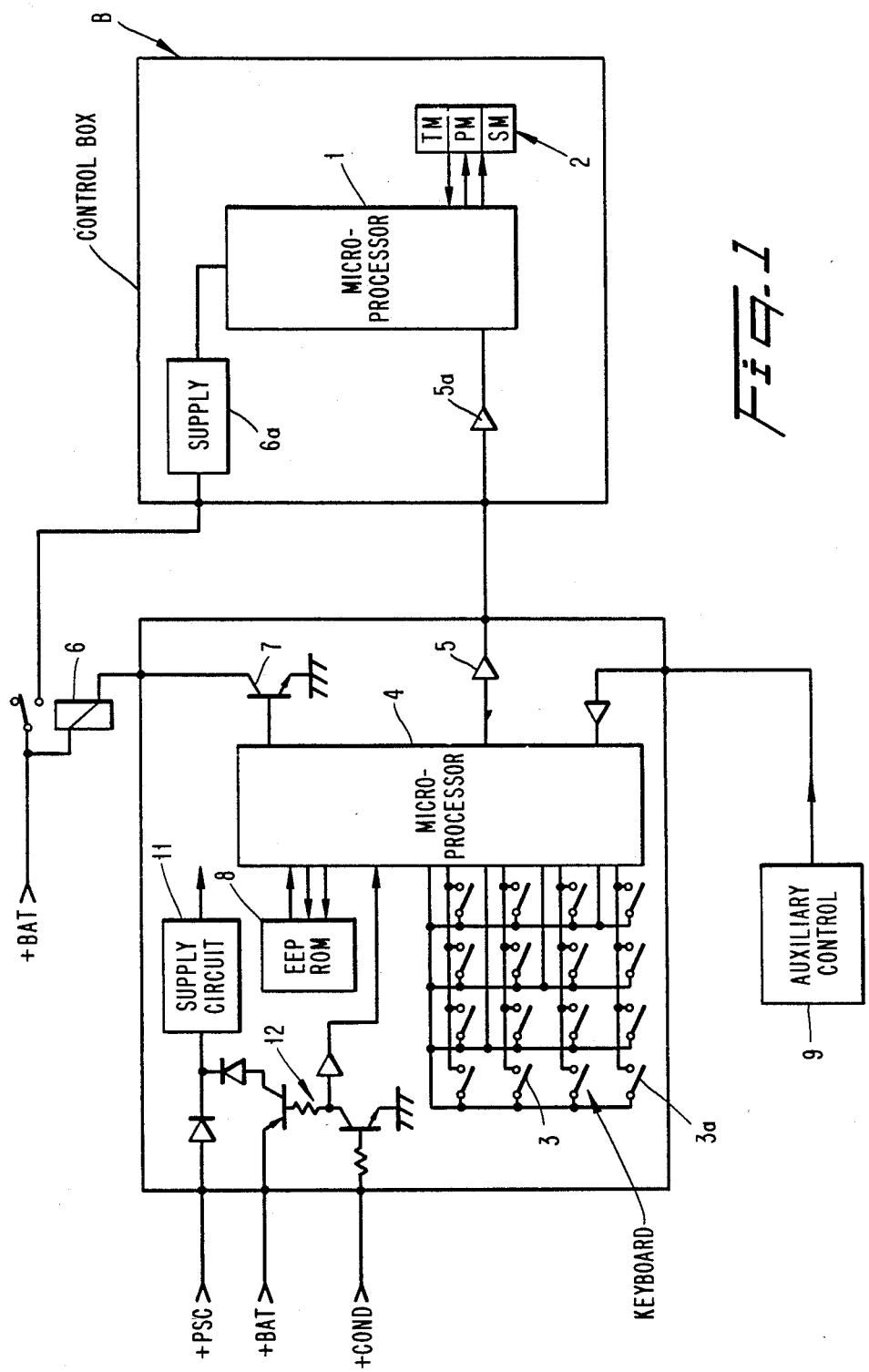
FIG. 1 is a schematic view of a protecting device according to the invention.

The protecting device shown in FIG. 1 comprises a microprocessor 1 which is part of the control box of the operation of the engine of the vehicle, which may be the control box of the ignition or injection.

Associated with the microprocessor 1 is a non-volatile electrically programmable memory EE PROM 2 which comprises three parts associated with the anti-theft function, namely a temporary memory TM, a permanent memory PM, and a state memory of the engine control box SM.

The device further comprises a keyboard 3 for entering data associated with a microprocessor 4 connected to the microprocessor 1 of the control box through an amplifier 5 and adaptation circuit 5a. The keyboard 3 has a key 3a for changing the code.

An output of the microprocessor 4 is moreover connected to a relay 6 controlling the supply 6a of the engine control box through a transistor 7.

The device is completed by a supply circuit 11 of the microprocessor 4 when the + PSC contact is established and by a device 12 for receiving the order + COND to lock the control box B to be transmitted to the latter through the microprocessor 4.

The device 12 also controls the supply 11 of the microprocessor 4 and the supply 6a of the control box B through the microprocessor 4, the transistor 7 and the relay 6.

Also associated with the microprocessor 4 is a non-volatile memory 8 of the EE PROM type adapted to store the codes emitted by an auxiliary control apparatus 9, such as an optical barwand, a magnetic map reader, an infrared ray radiation receiver or other device.

The device just described operates in the following manner:

The microprocessor 4 ensures the acquisition of the data produced by depressing keys of the keyboard 3, these data corresponding to the personal code of the user of the vehicle and translates these data in the form of a series message which is transmitted through the amplifier 5 and the adaptation circuit 5a to the input of the microprocessor 1 of the engine control box B.

The microprocessor 4 also controls through the transistor 7 and the relay 6 the supply of the engine control box B, which enables it, upon reception of an order for example from the positive terminal + COND of the supply of the motors for locking the doors of the vehicle, to supply the control box B during an interval of time required for giving the order to lock the box B. The order is transmitted in the form of a series message through the microprocessor 4 and the circuits 5 and 5a to the microprocessor 1 which stores it in the state memory SM.

The series message coming from the microprocessor 4 which permits the unlocking of the engine control box B contains the personal code of the user.

This code is stored both in the temporary memory TM and in the permanent memory PM of the memory 2. It is also termed the control box unlocking code.

The code reaching the microprocessor 1 is compared in succession with the code contained in the temporary memory TM and with the code contained in the permanent memory PM.

If there is coincidence between the code contained in the message received and those contained in the memories T and PM, the state memory SM changes to the unlocked state and the engine can be started up.

In the opposite case, the state memory SM remains locked and this prevents the starting up of the engine.

If the user wishes to modify the code for unlocking the control box B of the engine, he first of all enters by means of the keyboard 3 the preceding code which unlocks the control box B in accordance with the previously described procedure.

He depresses the code-changing key 3a, forms on the keyboard 3 the new code and validates the operation by a new actuation of the key 3a. This new code is then sent to the box B which stores it in the temporary memory TM.

When effecting the following unlocking, the user has the choice between the old code stored in the permanent memory PM and the new code stored in the temporary memory TM.

The code which he therefore composes on the keyboard 3 will validate the chosen code.

If the user composes once again the new code, the latter will become the sole code in operation.

On the other hand, if he makes a mistake or if he forgets the new code, the old code may be used and will remain the sole valid code.

Such a procedure will overcome forgetfulness, operating mistakes and ill-intentioned operations and possibly errors in the loading of the memories or accidental erasures.

The procedure is the following:

The control box B of the engine has a new code in the temporary memory TM and the old code in the permanent memory PM.

When a message arrives from the microprocessor 4, the microprocessor 1 compares it with the content of the memory TM, then with that of the memory PM. If there is a coincidence with one of the two contents, the microprocessor 1 on one hand aligns the content of the memories TM and PM with the content of the message and, on the other hand, changes the memory SM to the unlocked state, which enables it to enter the control loop of the engine.

Each time a message arrives from the keyboard 3, tere is therefore an updating of the content of the memories TM and PM, which imparts a high operating security to the system.

Furthermore, the fact that it is possible to easily change a code in all safety and to have available two memories PM and TM, permits the use of a specific code, for example "0000" for inhibiting the anti-theft function, which is of interest when the vehicle is left in charge of a garage.

If the microprocessor of the box B receives the code "0000", it transfers it to the memory TM and no longer accepts to lock the memory SM. Consequently, the control box B operates as if the anti-theft function did not exist.

To reactivate the anti-theft function, one operates as for a change of code by sending the corresponding code to the memory PM, then again this same code flanked by two actuations of the key 3a for changing the code of the keyboard 3.

In the new state, and in order to facilitate mounting operations, the control box B of the engine is delivered in the unlocked state with its memory TM in the state "0000", its memory PM in a known state, for example "0001", and its memory SM in the unlocked state.

The anti-theft function is consequently not yet activated.

To proceed to its activation, the code "0001" is typed on the keyboard 3, the key for changing the code is depressed, the personal code to be entered is typed on the keyboard 3 and the code-changing key 3a is again depressed.

To definitively eliminate the original code, the system is locked and then unlocked with the personal code.

To improve the comfort of utilization of the anti-theft system, it is possible to cause the emission of the series message by the microprocessor 4, with the aid of the auxiliary control device 9.

The message delivered by the device 9 is compared by the microprocessor 4 with a code contained in the memory 8.

Beforehand, in the same way as before, the user initializes the anti-theft function by causing the storage of his personal code in the control box B of the engine.

Then, after having unlocked the system with his personal code with the aid of the keyboard 3, he records the auxiliary code of the control device 9, for example an infrared remote control device, in the memory 8 associated with the microprocessor 4 by causing an emission followed by a depression of the code-changing key 3a which validates the operation.

When this auxiliary code has been recorded, each reception of this code by the microprocessor 4 causes the latter to transmit the user's code to the control box B of the engine and the unlocking of said box by the action of the memory SM.

Safety is complete since an error in recording of the auxiliary code can always be overcome by a second operation by using the keys of the keyboard for retyping the user's code.

A breakdown of this system can therefore be compensated for by a manual utilization. It is moreover possible in the event of breakdown to change both the keyboard and the control box of the engine and the auxiliary system without special programming tooling provided the user's code is known.

Figure 2:
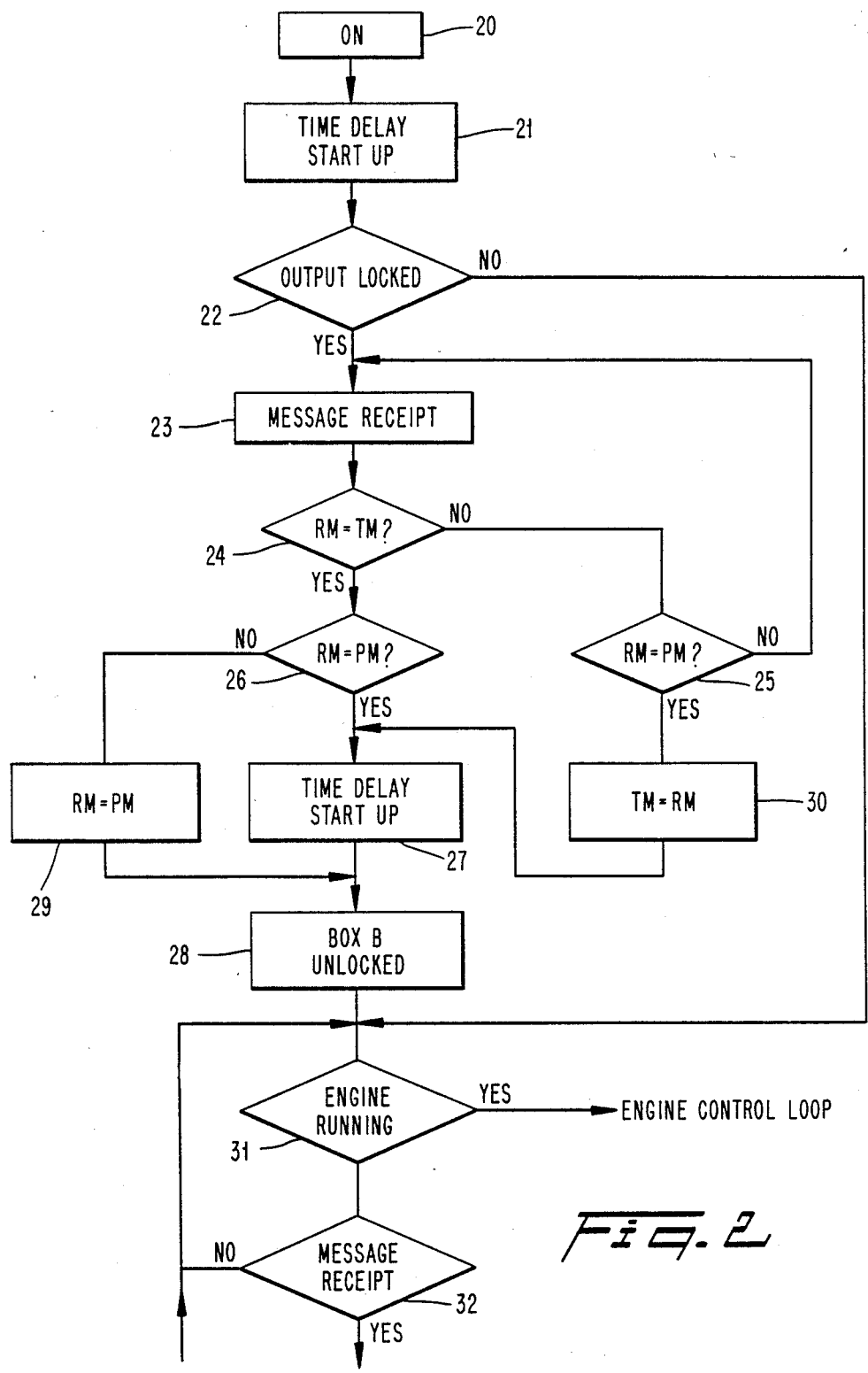
FIGS. 2 to 4 are flowcharts illustrating the operation of the protecting device of FIG. 1.
Figure 3:
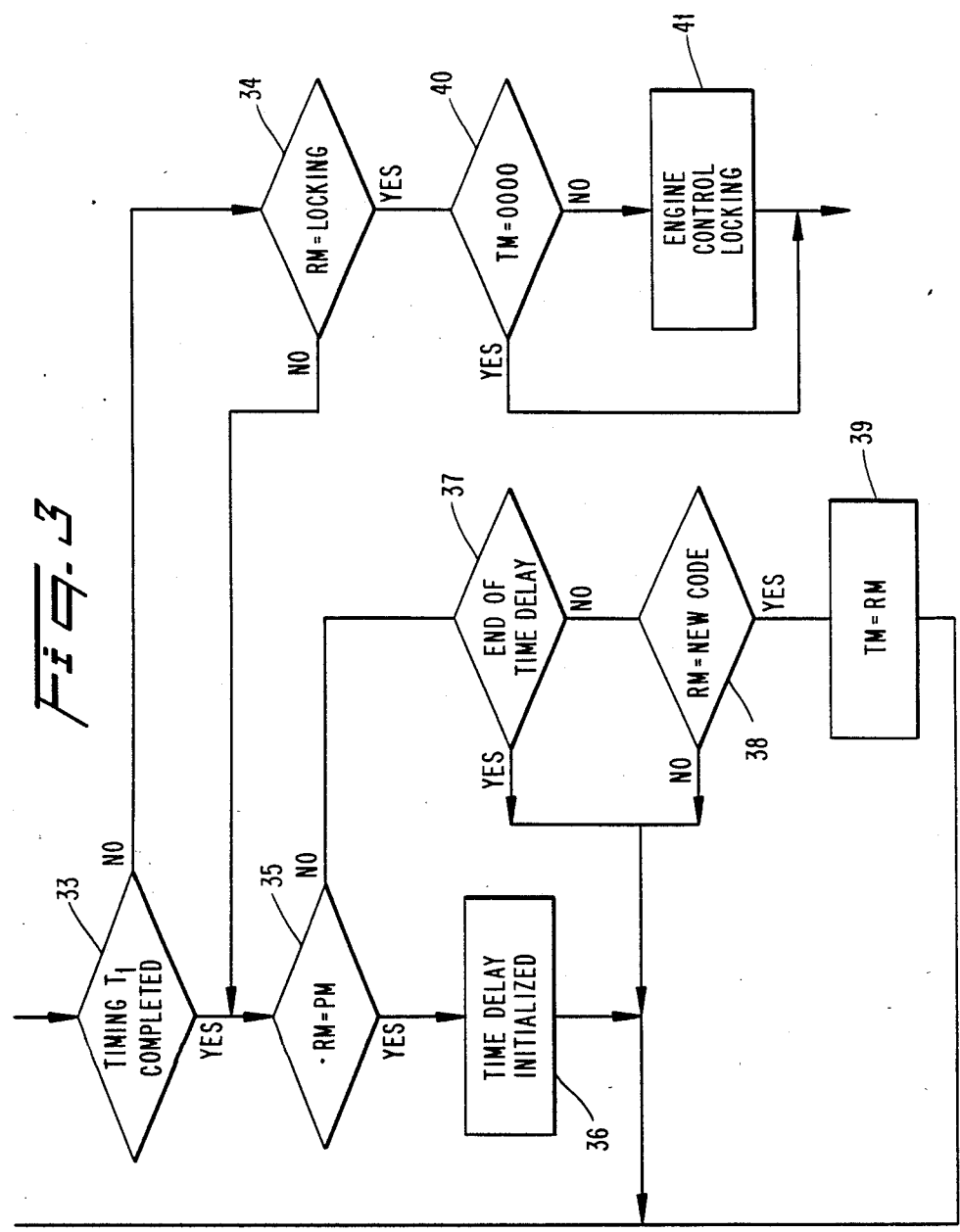

The flowchart shown in FIGS. 2 and 3 describes the operation of the control box of the engine without an auxiliary control device.

With the memory SM of the box B locked, the box is put in the state for receiving a message from the microprocessor 4.

Hereinafter, "locked box" will designate that the memory SM of the box is in the locked state.

For this purpose, the box is supplied in the course of the stage 20 which starts up a time delay T1 of 1 second in the course of the stage 21 followed by an interrogation stage 22 for determining whether the control box B is locked or not.

If the box B is locked, the message coming from the microprocessor 4 and composed on the keyboard 3 is received in the course of the stage 23.

Thereafter, in the course of stage 24, there is an interrogation for determining whether the received message RM coincides with the code contained in the temporary memory TM.

If the response is negative, one passes on to the interrogation stage 25 for determining whether the received message RM coincides with the code contained in the permanent memory PM. If the response is again negative, the message is refused as failing to correspond to any of unlocking codes and sent back to the reception stage 23.

On the other hand, if the response to the interrogation effected in the course of stage 24 is positive, one passes on to the interrogation stage 26 for determining whether the received message also coincides with the code contained in the permanent memory PM.

If the response to this interrogation is in the affirmative, this signifies that the code contained in the message is the user's code at present in use and that no modification of this code has been effected.

There is then initiated a stage 27 of a time delay T2 whose duration equals 30 seconds and there is initiated the unlocking of the control box B of the engine in the course of stage 28.

If the response to the interrogation effected in the course of stage 26 is negative, this signifies that the received message RM contains the new code TM intended to be substituted for the unlocking code contained in the memory PM and one then proceeds in the course of stage 29 to substitute for the code contained in the memory PM the code contained in the memory TM, after which, the box B may be unlocked in the course of stage 28. However, the time delay stage 27 is eliminated in order to prevent another code change immediately after this code change If the response to the interrogation effected in the course of stage 25 is in the affirmative, this signifies that the code contained in the received message differs from the code contained in the temporary memory TM but coincides with the unlocking code contained in the memory PM.

Then, in the course of stage 30, the code contained in the memory TM is aligned with the code contained in the memory PM and the time delay stage 27 is initiated in the same way as at the end of phase 26.

Optionally, it is possible, after a certain number of false messages detected in the course of stage 25, to prevent a new reception during a certain period of time in order to avoid a systematic exploration of the codes.

With the box B unlocked, either at the end of stage 28 or as a result of the interrogation stage 22, one proceeds to an interrogation stage 31 for determining whether the engine is running and to an interrogation stage 32 for determining whether there is a reception of a new message from the microprocessor 4.

In the case where the engine is in fact running, the box B ensures the control of the operation of the engine without being concerned by messages which may be sent thereto.

If the engine is not running and a message is received by the control box B, there is examined in the course of stage 3 whether the timing period T1 has terminated.

If the new message is received before the end of the time delay period T1, it is determined in the course of stage 3 whether this message is a locking message.

If the new message is received after the end of the time delay period T1, it is determined in the course of stage 35 whether the received message RM coincides with the unlocking code stored in the permanent memory PM.

If so, the time delay T2=30 seconds is again initialized in the course of stage 36 which authorizes the code change and thus permits the code to be changed even if the control box B (FIG. 1) has not been previously locked.

If there is no coincidence between the new message and the unlocking code, it is determined in the course of stage 37 whether the time delay T2 initiated in the course of stage 27 (FIG. 2) or in the course of stage 36 is terminated.

If the time delay T2 is not terminated, it is made sure in the course of stage 38 that the message RM contains the new code accompanied by a code-changing request attribute. In the affirmative, in the course of stage 39, there is brought about by making TM =RM the storage in the temporary memory TM of the code contained in the received message, this code being intended to become the new unlocking code.

In the opposite case, one returns to the start of the loop, i.e., stage 31, involving the interrogation concerning the running of the engine.

One will now return to the stage 34 relating to the nature of the new message RM received while the engine of the vehicle is not running and the time delay T1 is not terminated.

If the message received is not a locking message, one passes to the interrogation stage 35 for determining whether the received message RM is or is not equal to the user's code PM.

If the message received is a locking message, the locking can only be brought about if the time delay memory TM contains no code such as "0000" which permits the inhibition of the anti-theft function.

This situation is checked in the course of stage 40. If TM is different from the code for inhibiting the anti-theft function, the locking of the box B (FIG. 1) is brought about in the course of stage 41 by putting the memory SM in the locked state.

If TM is equal to the inhibition code, the locking stage 41 is shunted.

At the end of stages 40 and 41, one returns to the beginning of the flowchart just after stage 20 for switching on the system.

The flowchart of the microprocessor 4 associated with the keyboard with no additional entry for the remote control and no auxiliary memory 8 amounts to the acquisition of the signals resulting from the actuation of the keys of the keyboard 3 in a given order and presents no particular difficulty.

On the other hand, in the case where it is desired to bring about the unlocking of the control box B of the engine by an automatic emission of the user's code, the code pertaining to the auxiliary device 9 must be stored in the memory.

Figure 4:
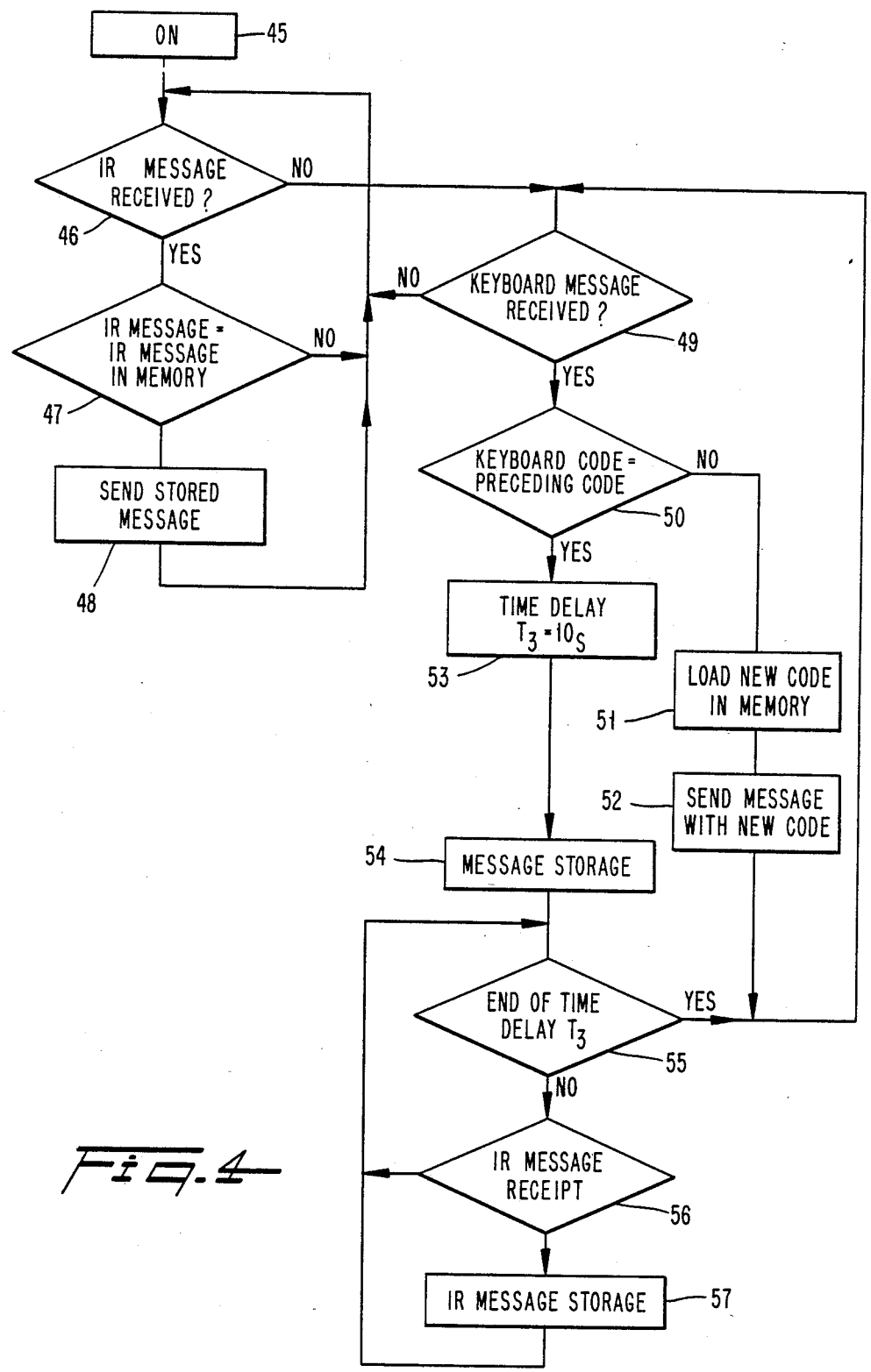

The flowchart of FIG. 4 explains the operation of the device in the latter case.

When turning on the system in the course of stage 45, the microprocessor 4 of the device awaits, either an initiation coming from the auxiliary device 9 in the form of for example an infrared remote control signal IR, or a pulse coming from the keyboard 3. In the course of stage 46, the system is interrogated in order to determine whether a message IR has been received.

In the affirmative, there is effected in the course of stage 47 a comparison of the received message IR with the code of the auxiliary device 9 previously stored in the auxiliary memory 8 (FIG. 1).

If there is a coincidence between these two codes, there is brought about in the course of stage 48 the sending by the microprocessor 4 to the microprocessor 1 of the box B of a message containing the user's code also previously stored in the auxiliary memory 8.

In the opposite case, one returns to the beginning of the loop to await a new message IR and no order to transmit the user's code is transmitted to the microprocessor 4.

If it is found in the course of stage 46 that no message is received from the auxiliary control device 9, there is effected in the course of stage 49 an interrogation relating to the reception by the processor 4 of a message composed on the keyboard 3.

If this is not the case, one returns to the state of awaiting a new message. If a code has been received on the keyboard 3, it is determined in the course of stage 50 whether this code is identical to the preceding code stored in the auxiliary memory 8.

If there is no coincidence, in the course of stage 51, the new code is loaded into the auxiliary memory 8 and, in the course of stage 52, the message with the new code is sent to the microprocessor 1 of the control box B where it will be compared, in accordance with the procedure described with reference to FIGS. 2 and 3, with the codes contained in the temporary memory TM and in the permanent memory PM of the EE PROM 2.

If there is a coincidence between the code composed on the keyboard 3 and that stored in the auxiliary memory 8, there is initiated a stage 53 of time delay having a duration T3 = 10 seconds, and in the course of stage 54, the message containing the user's code is sent to the microprocessor 1 of the control box B.

It is checked in the course of stage 55 that the time delay T3 has ended.

If the time delay T3 is in process, it is ensured that there is a reception in the course of stage 56 of an IR message coming from the auxiliary control device 9.

If this is the case, the IR message is stored in the course of stage 57 in the auxiliary memory 8.

To store the message IR, the user's code must be entered by means of the keyboard 3 and the latter must have been used at least twice for security reasons and for avoiding malevolent actions.

There are then 10 seconds available from the time delay stage 53 for transmitting the message IR from the auxiliary control device 9 to the microprocessor 4 which effects its storage in the auxiliary memory 8.

If the code composed on the keyboard 3 is different from that employed the preceding time, it is not possible to store the code IR but the microprocessor 4 sends the message containing the new code to the microprocessor 1 of the control box B of the engine, whether it coincides or does not coincide with the codes contained in the its memories TM and/or PM.

An ill-intentioned person may therefore possibly modify the content of the memory 8 relating to the code of the message IR but it will be impossible for him to transmit to the control box B of the engine a message which will be capable of causing its unlocking, since any modification of the code of the message IR can only be achieved by modifying the user's code stored in the memory 8.

Although the device just described has been considered to be applicable to the protection against theft of vehicles provided with a control box for the engine, it is also applicable to any control system equipped with a microprocessor such as an automatic gearbox or other system.

Moreover, the scope of the invention is not limited to the protection against theft of automobile vehicles; the invention is also of use in coded security systems.

I claim:

1. A device for protecting against theft of in particular an automobile vehicle provided with an automatic control for an element of said vehicle such as the engine, said protecting device comprising in combination a keyboard for entering a code of a user of said vehicle, means for converting data entered in said keyboard into an output message containing said user's code, programmable and non-volatile memory means for storing a code for unlocking an electronic control device of said engine, means for comparing said unlocking code stored in said memory means with said user's code contained in said message coming from said keyboard and for unlocking said electronic control device of said engine upon coincidence of said unlocking code contained in said memory means with said user's code contained in said output message, and means for replacing said unlocking code of said control device of said engine by a new unlocking code by action on said keyboard.

2. A protecting device according to claim 1, wherein said memory means for storing said unlocking code of said electronic control device of said engine comprise an electrically programmable memory EE PROM.

3. A protecting device according to claim 1, wherein said means for comparing said unlocking code stored in said memory means with said user's code contained in said message coming from said keyboard comprise a microprocessor which is part of said electronic control device of said engine.

4. A protection device according to claims 1, wherein said memory means for storing said unlocking code of said electronic control device of said engine comprise a permanent memory for storing the unlocking code in use and a temporary memory for storing selectively the same unlocking code in use in the course of operation of said device with an established user's code and a new unlocking code composed by said user on said keyboard, and means for substituting said new unlocking code for said unlocking code in use stored in said permanent memory.

5. A protection device according to claim 4, wherein said means for comparing said unlocking code stored in said memory means with said user's code contained in said message coming from said keyboard comprise a microprocessor which is part of said electronic control device of said engine said means for comparing said unlocking code stored in said memory means with said user's code contained in said message coming from said keyboard comprise a microprocessor which is part of said electronic control device of said engine, and said means for substituting said new unlocking code for said unlocking code in use comprise said keyboard with which are associated said conversion means, said microprocessor of said control device of said engine and said temporary memory of said memory means.

6. A protection device according to claim 1, wherein said keyboard includes a code-changing key.

7. A protection device according to claim 1, further comprising an auxiliary automatic control device for an emission of the user's code and a programmable and non-volatile auxiliary memory connected to a microprocessor which constitutes said conversion means associated with said keyboard, said programmable auxiliary memory being effective to store the code pertaining to said auxiliary control device and said user's code, and said microprocessor associated with said keyboard constitutes a device for comparing said code stored in said programmable auxiliary memory with said code it receives from said auxiliary control device, the transmission of said user's code to said control device from said microprocessor being conditioned by said coincidence between the code received from said auxiliary control device and said code stored in said programmable auxiliary memory.

8. A protection device according to claim 3, further comprising a programmable and non-volatile state memory for storing selectively the locked and the unlocked state of said electronic control device of said engine, the locked state of said state memory preventing normal operation of said microprocessor of said control device of said engine.

* * * * *